United States Patent
Yoneda

(10) Patent No.: US 6,353,512 B1
(45) Date of Patent: Mar. 5, 2002

(54) TAPE GUIDE MECHANISM FOR REGULATING TAPE LEVEL WITHOUT CONTACT WITH MAIN SURFACE OF TAPE IN TAPE RECORDER

(75) Inventor: Haruhiko Yoneda, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/414,100

(22) Filed: Oct. 7, 1999

(30) Foreign Application Priority Data

Oct. 7, 1998 (JP) ............................................. 10-284970

(51) Int. Cl.$^7$ .............................................. G11B 15/60
(52) U.S. Cl. ................... 360/130.22; 242/615
(58) Field of Search ...................... 360/130.22, 130.23, 360/130.21, 85, 95; 242/346, 615, 615.3, 615.4

(56) References Cited

U.S. PATENT DOCUMENTS 4,379,517 A * 4/1983 Miyakawa et al.

* cited by examiner

Primary Examiner—Craig A. Renner
(74) Attorney, Agent, or Firm—Hogan & Hartson, L.L.P.

(57) ABSTRACT

A tape recorder of the invention comprises a fixed guide member 5 disposed for a path of travel of a magnetic tape 10 between a tension post 43 and a full-width erasing head 21 and having a tape guide face 54 to be brought into sliding contact with the lower of a pair of side edges of the tape 10 between the main surface thereof, with the lower side edge positioned closer to the chassis 1. The fixed guide member 5 regulates the level of the tape 10 widthwise thereof by receiving the lower side edge of the tape by the tape guide face 54 while being held out of contact with the main surface of the tape 10. The recorder can be manufactured at a lower cost without impairing the accuracy of the path of travel of the tape.

2 Claims, 5 Drawing Sheets

TAPE GUIDE MECHANISM FOR REGULATING TAPE LEVEL WITHOUT CONTACT WITH MAIN SURFACE OF TAPE IN TAPE RECORDER

FIELD OF THE INVENTION

The present invention relates to tape recorders wherein a path of travel of a magnetic tape extends from a supply reel support to a rotary head cylinder and returns to a take-up reel support for recording signals on the tape or reproducing signals from the tape when the tape travels along the path, and more particularly to a tape guide mechanism for causing the magnetic tape to extend along the path of travel as specified.

BACKGROUND OF THE INVENTION

With reference to FIG. 8, video tape recorders (VTRs) comprise a supply reel support 3 and a take-up reel support 31 arranged on a chassis 1 and a rotary head cylinder 2 mounted on the chassis 1 in a predetermined inclined posture. Arranged at opposite sides of the cylinder 2 are a pair of leading guide posts 4, 41 reciprocatingly movable along respective guide grooves 11, 12. A magnetic tape 10 is withdrawn from a tape cassette (not shown) by the advance of the guide posts 4, 41. The tape 10 is wound around the head cylinder 2 and brought into sliding contact with a plurality of tape guide members to be described below to provide a specified path of travel of the tape.

Arranged on the chassis 1 along the specified path are a fixed guide post 42, tension post 43, fixed guide post 44, full-width erasing head 21, sound erasing head 22, sound/control head 23, fixed guide post 45, capstan 46, pinch roller 47 and withdrawing guide post 48. The capstan 46, when driven, moves the tape 10 in one direction for recording or reproduction of signals.

For example, the fixed guide post 44 disposed at a position immediately backward from the full-width erasing head 21 with respect to the direction of travel of the tape is a tape guide member by which the magnetic tape 10 withdrawn by the tension post 43 on a tension lever 49 is guided at a specified level to the erasing head 21 as shown in FIG. 6. The guide post 44 comprises a pole portion 44a for the main surface of the tape 10 to be brought into sliding contact therewith, and a flange portion 44b positioned for sliding contact with the lower of a pair of side edges at opposite sides of the main surface of the tape 1. The lower side edge of the tape 10 which is closer to the chassis 1 bears on the upper face of the flange portion 44b, with the main surface of the tape 10 in sliding contact with the peripheral surface of the pole portion 44a, whereby the level of the tape 10 is regulated widthwise thereof.

Since the level of the magnetic tape 10 tends to lower toward the chassis 1 in the section of the tape travel path between the tension post 43 and the full-width erasing head 21, the level of the tape 10 can be regulated satisfactorily when the tape 10 is restrained from lowering at one side only.

As described above, the VTR has at least three fixed guide posts 42, 44, 45 in order to provide the specified path of travel of the tape. High precision is required of these fixed guide posts 42, 44, 45 with respect to the position and posture thereof. Especially, the fixed guide post 44 comprising the pole portion 44a and the flange portion 44b as shown in FIG. 6 requires high precision in forming the pole portion 44a on the flange portion 44b.

However, highly accurate press work is required in the case where the fixed guide post 44 comprising the pole portion 44a and the flange portion 44b is to be provided in the form of an integral piece of metal, highly accurate press work is required to entail a problem in manufacturing cost. Further when the post 44 is prepared as an assembly by joining a pole member and a flange member of metal to a resin boss, an increase in the number of components makes the assembly process complex, giving rise to problems with respect to the manufacturing cost and the accuracy of assembling.

SUMMARY OF THE INVENTION

An object of the present invention is to provide a tape guide mechanism for use in VTRs and like tape recorders which mechanism can be manufactured at a lower cost than conventionally without impairing the accuracy of the path of travel of the tape.

While VTRs and like tape recorders have at least three fixed guide posts 42, 44, 45 arranged on the chassis 1, we directed attention to the fixed guide post 44 disposed between the tension post 43 and the full-width erasing head 21. In the case where the fixed guide post 44 comprises a pole portion 44a and a flange portion 44b as in the prior art, the pole portion 44a serves the function of guiding the main surface of the magnetic tape 10 (tape main surface guiding function), and the flange portion 44b receives the lower side edge of the tape 10, performing the function of regulating the level of the tape 10 widthwise thereof (tape edge guiding function). Our research conducted on these two guiding functions of the fixed guide post 44 has revealed that the tape edge guiding function is important and indispensable, but that the tape main surface guiding function is not always essential. We have found that a trouble-free path of travel of the tape can be provided even if the tape main surface guiding function is dispensed with, by modifying the position and orientation of the full-width erasing head 21, and accomplished the present invention.

The present invention provides a tape recorder in which a path of travel of a magnetic tape 10 extends from a supply reel support 3 toward a rotary head cylinder 2 and which comprises, as arranged on a chassis 1 along the path from a position close to the supply reel support 3, a fixed guide post 42 for guiding the travel of the tape, a tension post 43 for imparting definite tension to the tape 10, and a full-width erasing head 21 for erasing signals recorded on a main surface of the tape 10 over the entire width thereof.

The recorder includes a fixed guide member 5 disposed for the path between the tension post 43 and the erasing head 21 and having a tape guide face 54 to be brought into sliding contact with the lower of a pair of side edges of the tape 10 between the main surface thereof, with the lower side edge positioned closer to the chassis 1. The fixed guide member 5 regulates the level of the tape 10 widthwise thereof by receiving the lower side edge of the tape by the tape guide face 54 while being held out of contact with the main surface of the tape 10.

The tape recorder of the invention described above has the fixed guide member 5 serving the tape edge guiding function only and substituted for the conventional fixed guide post 44 comprising a pole portion and a flange portion and disposed between the tension post 43 and the full-width erasing head 21. Thus, the tape main surface guiding function is dispensed with. As previously described, the tape guide member to be disposed between the tension post 43 and the full-width erasing head 21 need not always have the tape main surface guiding function. Even when the tape guide mechanism has such a fixed guide member 5, a path of travel of the tape is provided which ensures signal recording or reproduction free of trouble.

Accordingly, the fixed guide member 5 need not have the conventional pole portion but is formed with the tape guide face 54 only to perform the tape edge guiding function. The fixed guide member 5 therefore has a very simple construction, which readily assures the tape guide face 54 of accuracy.

Stated more specifically, the fixed guide member 5 comprises a resin boss 52 provided upright on the chassis 1, and a metal flange plate 51 attached to an upper end of the boss 52, and the boss 52 has a flange receiving face 56 receiving a rear side of the flange plate 51, and a plurality of elastic hooks 53, 53 engaging a front side of the flange plate 51 on the flange receiving face 56, the front side of the flange plate 51 providing the tape guide face 54. With this specific construction, the boss 52 of the fixed guide member 5 can be attached to the chassis 1 along with other members, for example, by outsert molding of resin. The flange plate 51 can be secured to the boss 52 easily by placing the plate 51 on the flange receiving face 56 of the boss 52 and engaging the elastic hooks 53, 53 with the plate 51.

Insofar as the fixed guide member 5 of the specific construction described above fulfills the requirement that the member needs to serve the tape edge guiding function only, with the tape main surface guiding function dispensed with, the fixed guide member is usable not only between the tension post 43 and the full-width erasing head 21 but also as other tape guide members constituting the tape guide mechanism.

Thus, the fixed guide member of simple construction serving only the tape edge guiding function as essentially required for providing the specified tape travel path is usable in place of the conventional fixed guide post which comprises a pole portion and a flange portion, in constituting a tape guide mechanism of the invention for use in tape recorders. This results in a lower manufacturing cost than conventionally without impairing the accuracy of the tape travel path.

DETAILED DESCRIPTION OF EMBODIMENT

Figure 8:
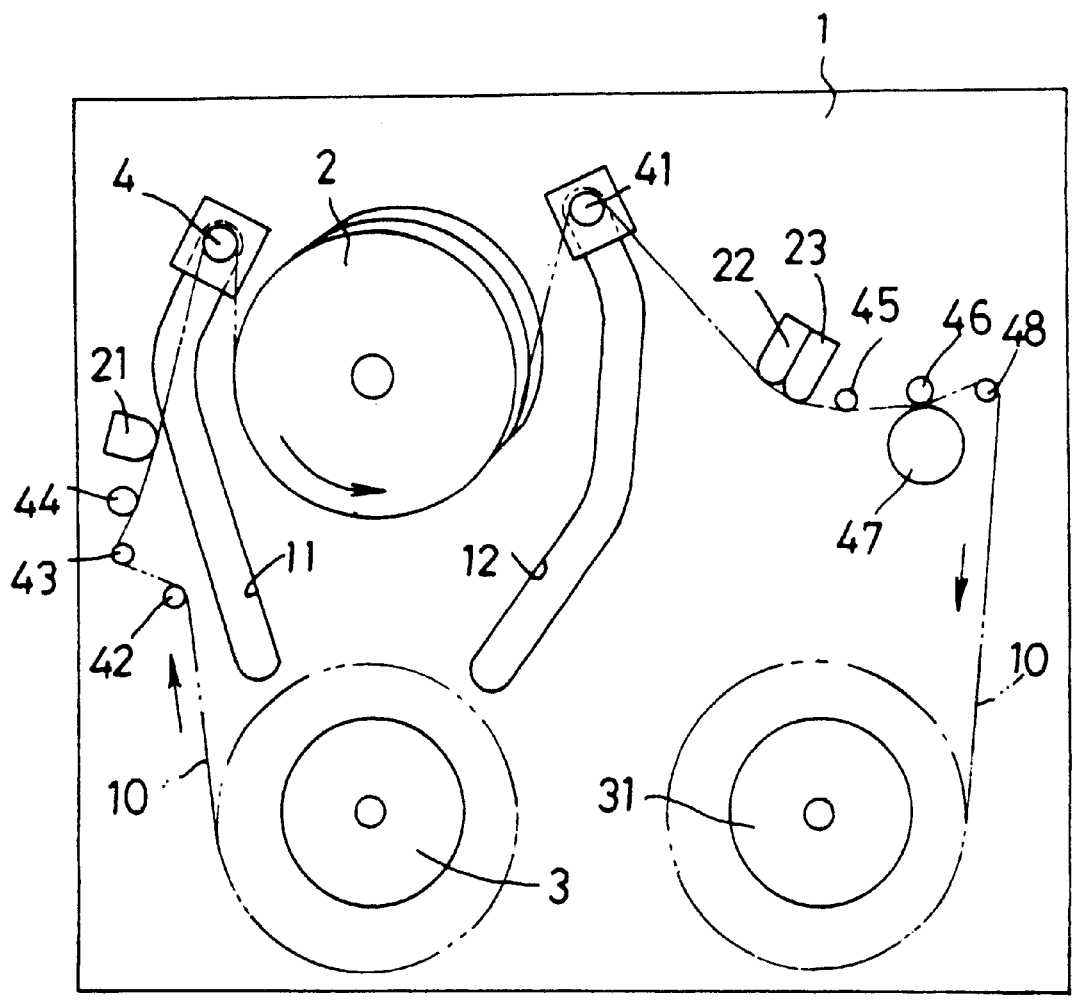
FIG. 8 is a plan view showing the main components of the VTR.

With reference to the drawings, a detailed description will be given below of the present invention as embodied for the VTR shown in FIG. 8.

Figure 1:
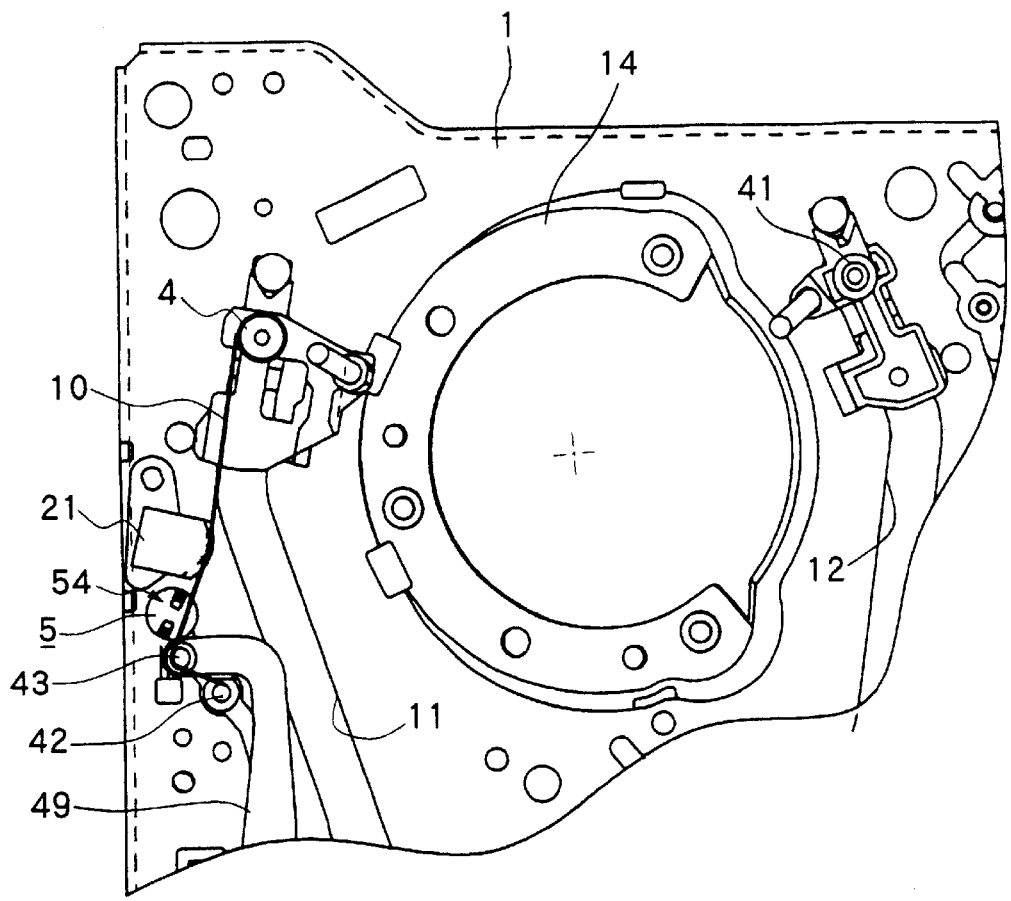
FIG. 1 is a fragmentary plan view showing a VTR according to the invention.

As shown in FIG. 1, the chassis 1 is formed with a supply side guide groove 11 and a take-up side guide groove 12 at opposite sides of a cylinder base 14 on which a rotary head cylinder (not shown) is to be mounted. The guide grooves 11, 12 guide a leading guide post 4 at the supply side and a leading guide post 41 at the take-up side, respectively, for a reciprocating movement.

The advance of the two guide posts 4, 41 withdraws a magnetic tape 10 from a tape cassette (not shown) as illustrated, and the tape guide mechanism to be described below provides a specified path of travel of the tape 10.

The tape guide mechanism of the VTR according to the invention has the same construction as that of the conventional VTR shown in FIG. 8 with the exception of replacing the fixed guide post 44 of the conventional VTR by a fixed guide member 5 shown in FIGS. 2 and 3 and slightly altering the position of a full-width erasing head 21 as will be described later.

For example, the section of the path of travel extending from a supply reel support (not shown) to the leading guide post 4 at the supply side is provided with a fixed guide post 42 for the main surface of the tape 10 to come into sliding contact therewith, a tension post 43 for giving definite tension to the tape 10, the fixed guide member 5 for the lower side edge of the tape 10 to come into sliding contact therewith, and the full-width erasing head 21 for erasing the signals recorded on the main surface of the tape 10 over the entire width thereof, these components being arranged in the order mentioned as seen in FIG. 1. The tension post 43 is provided at one end of a tension lever 49 which is biased counterclockwise.

Figure 3:
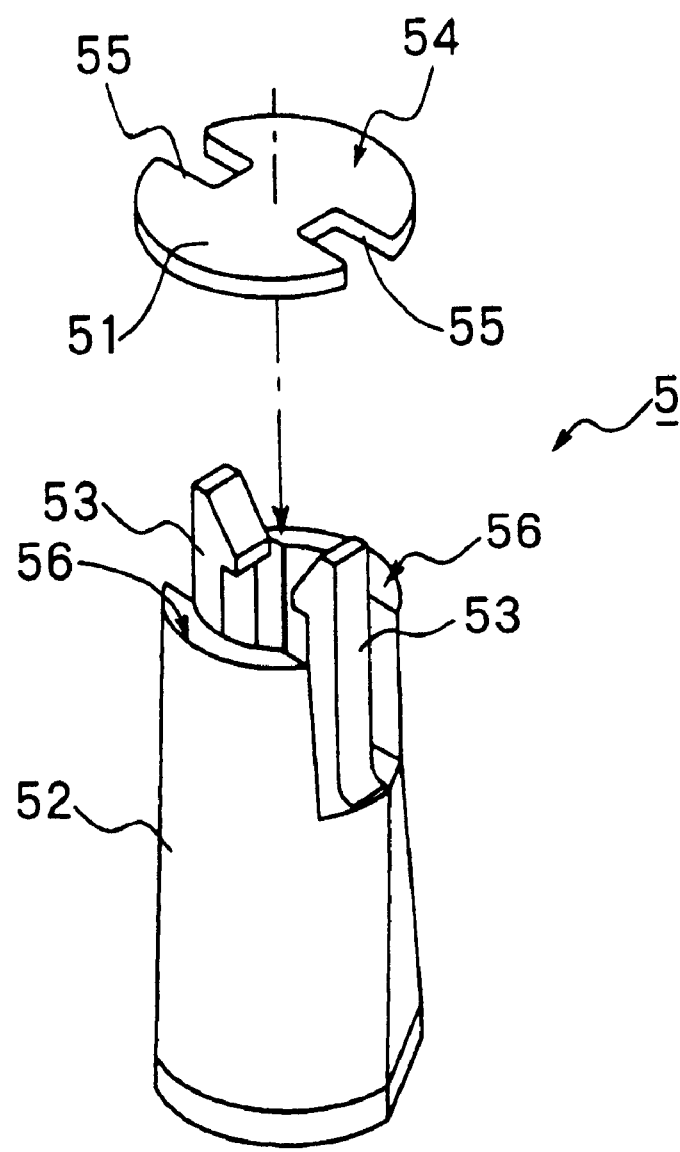
FIG. 3 is an exploded perspective view of the fixed guide member.

With reference to FIG. 3, the fixed guide member 5 comprises a boss 52 made of a resin and in the form of a hollow cylinder, and a flange plate 51 in the form of a metal disk and secured to the upper end of the boss 52. The front side of the flange plate 51 provides a tape guide face 54. The boss 52 has a flange receiving face 56 for the rear side of the flange plate 51 to bear on, and a pair of elastic hooks 53, 53 engaging in respective recesses 55, 55 in the flange plate 51 placed on the flange receiving face 56 to latch the flange plate 51.

Figure 2:
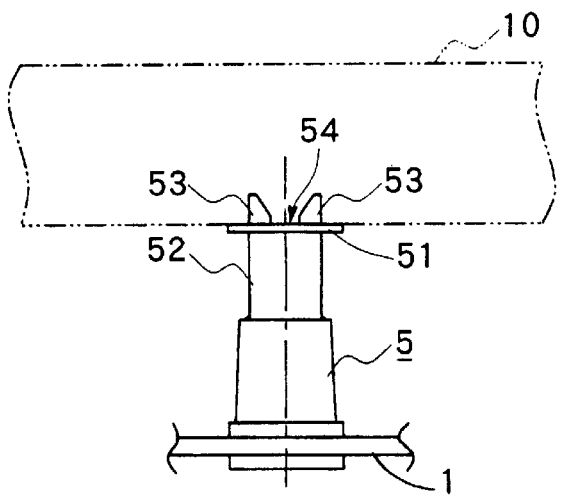
FIG. 2 is a side elevation of a fixed guide member.

The boss 52 of the fixed guide member 5 is attached to the chassis 1 as shown in FIG. 2 by outsert molding. The hooks 53, 53 of the boss 52 elastically engage the flange plate 51 to secure the flange plate 51 to the boss 52 by pressing the flange plate 51 against the upper end of the boss 52.

While extending along the specified path as shown in FIG. 1, the magnetic tape 10 passes through a position on the tape guide face 54 of the fixed guide member 5, away from the hooks 53, 53, with the lower side edge of the tape 10 in sliding contact with the guide face 54 as seen in FIG. 2.

Figure 4:
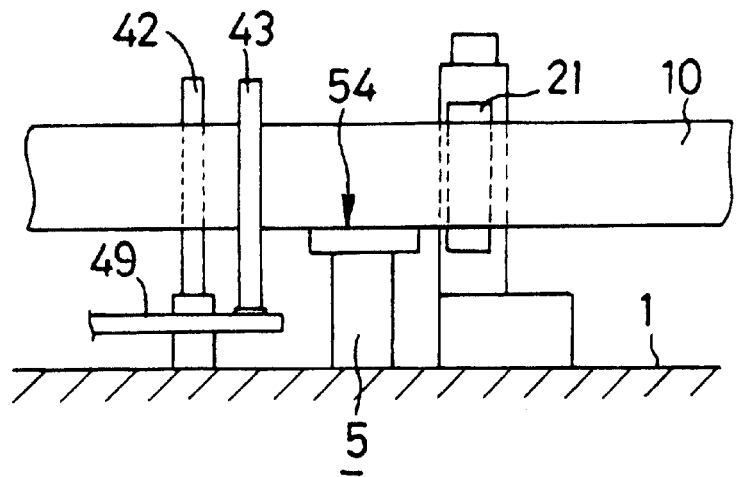
FIG. 4 is a side elevation showing a magnetic tape while the tape is being guided by the fixed guide member and tape guide members preceding and subsequent thereto.

Consequently, while being guided from the fixed guide post 42 to the tension post 43 and then to the full-width erasing head 21 as shown in FIG. 4, the tape 10 has its level regulated widthwise thereof by the tape guide face 54, whereby the specified path of travel is eventually provided via the rotary head cylinder, etc.

Figure 5:
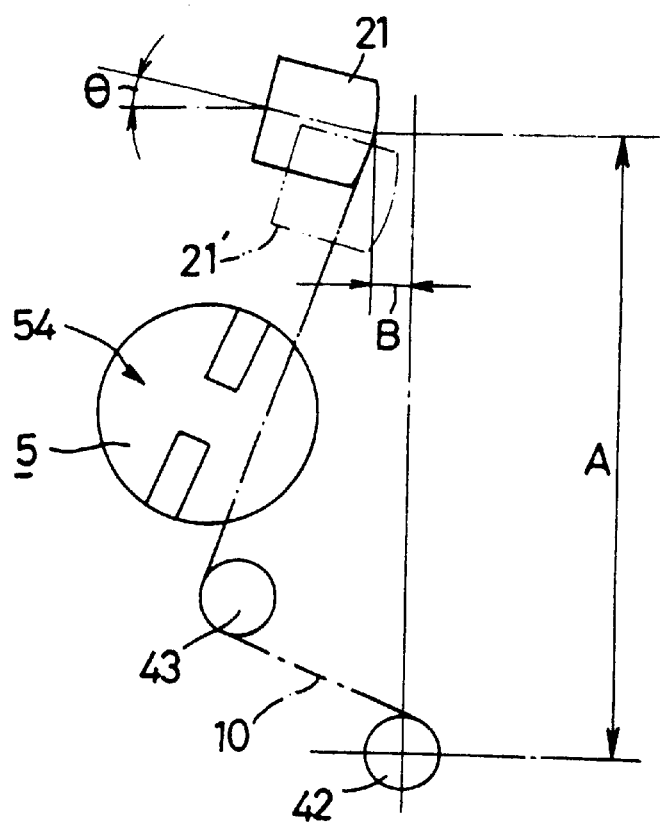
FIG. 5 is a plan view showing the position relationship between the fixed guide member and these tape guide members.
Figure 6:
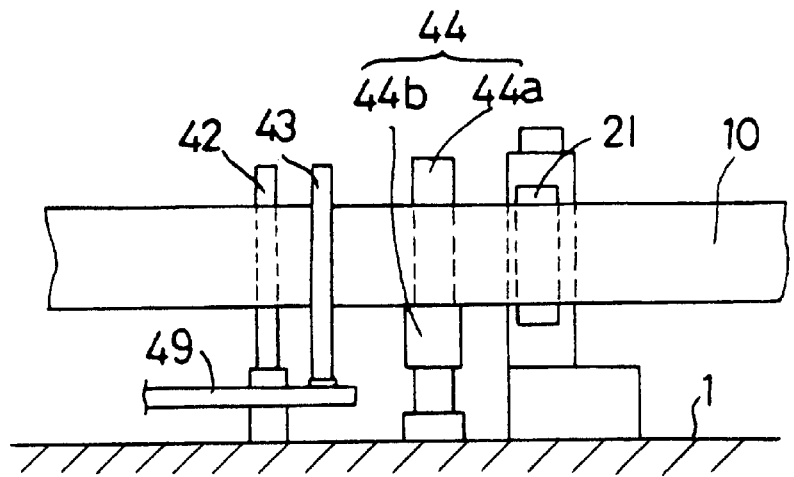
FIG. 6 is a side elevation showing a magnetic tape while the tape is being guided in a conventional VTR by a fixed guide post and tape guide members preceding and subsequent thereto.
Figure 7:
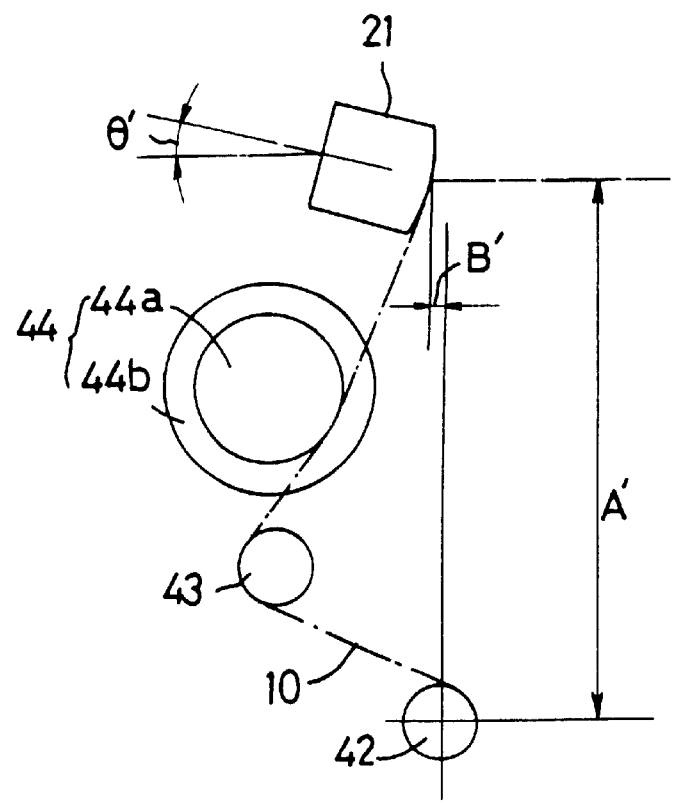
FIG. 7 is a plan view showing the position relationship between the fixed guide post and these tape guide members of the conventional VTR.

The position of the erasing head 21 is slightly altered from the position shown in FIG. 7 to the position shown in FIG. 5 owing to the elimination of the tape main surface guiding function of the conventional fixed guide post 44 comprising a pole portion and a flange portion.

Stated more specifically, when the position (distances A and B in FIG. 5) of the erasing head 21 relative to the fixed guide post 42 and the posture (angle θ in FIG. 5) of the head 21 in the arrangement of the invention shown in FIG. 5 are compared with the position (distances A' and B' in FIG. 7) of the erasing head 21 relative to the fixed guide post 42 and the posture (angle θ' in FIG. 7) of the head 21 in the conventional arrangement shown in FIG. 7, A>A', B>B' and θ<θ'. Thus, the position of the erasing head 21 of the invention is slightly altered from the conventional position 21' shown in a chain line in FIG. 5 toward a direction away from the fixed guide post 42.

When compared with the conventional travel-path (FIG. 7), that of the invention (FIG. 5) is slightly different from the conventional path in the section between the tension post 43 and the erasing head 21, but is made identical with the conventional path by the foregoing adjustment of the position and posture of the head 21, with respect to the angle at which the tape 10 is reeved around the erasing head 21 and the section of the path extending from the erasing head 21 to the rotary head cylinder and returning to the take-up reel support. Signals can therefore be recorded or reproduced free of any trouble.

In the case of the tape guide mechanism embodying the invention described above, the boss 52 constituting the fixed guide member 5 can be made from a resin easily by integral molding, the flange plate 51 can be prepared from a metal sheet easily as by blanking, and the flange plate 51 can be joined to the boss 52 also with ease. The fixed guide member 5 can therefore be manufactured at a greatly reduced cost as compared with the conventional fixed guide post 44 comprising a pole portion 44a and a flange portion 44b.

Since the boss 52 of the fixed guide member 5 can be molded with high accuracy, the flange plate 51 can be held to the flange receiving face 56 by being latched by the elastic hooks 53, 53, as supported at an accurate level in an accurate posture, with the result that the level of the magnetic tape 10 can be regulated accurately.

The device of the present invention is not limited only to the foregoing embodiment in construction but can be modified variously by one skilled in the art without departing from the spirit of the invention as set forth in the appended claims. For example, the fixed guide member 5 is not limited to the assembly of boss 52 and flange plate 51 but can alternatively be an integral member of a resin. This serves to reduce the number of parts. The resin to be used in this case is preferably a rigid resin having high abrasion resistance.

What is claimed is:

1. In a tape recorder which comprises a plurality of tape guide members arranged on a chassis (1) to provide a path of travel of a magnetic tape (10) extending from a supply reel support (3) to a rotary head cylinder (2) and returning to a take-up reel support (31) and wherein signals are recorded on or reproduced from the tape (10) when the tape (10) travels along the path, a tape guide mechanism characterized in that at least one of the tape guide members comprises a fixed guide member (5) having a tape guide face (54) to be brought into sliding contact only with the lower of a pair of side edges of the tape (10), with the lower side edge positioned closer to the chassis (1), the fixed guide member (5) comprising a resin boss (52) provided upright on the chassis (1), and a metal flange plate (51) attached to an upper end of the boss (52), the boss (52) having a flange receiving face (56) receiving a rear side of the flange plate (51), and a plurality of elastic hooks (53, 53) engaging a front side of the flange plate (51) on the flange receiving face (56), the front side of the flange plate (51) providing the tape guide face (54), the fixed guide member (5) being operable to regulate the level of the tape (10) widthwise thereof by receiving the lower side edge of the tape by the tape guide face (54) while being held out of contact with the main surface of the tape (10).

2. In a tape recorder in which a path of travel of a magnetic tape (10) extends from a supply reel support (3) toward a rotary head cylinder (2) and which comprises, as arranged on a chassis (1) along the path from a position close to the supply reel support (3), a fixed guide post (42) for guiding the travel of the tape, a tension post (43) for imparting definite tension to the tape (10), a fixed guide member (5) for regulating the level of the tape (10) widthwise thereof by receiving the lower side edge of the tape, and a full-width erasing head (21) for erasing signals recorded on a main surface of the tape (10) over the entire width thereof, wherein the fixed guide member (5) has only one guide portion to be brought into sliding contact with tape (10), the guide portion being formed with a tape guide face (54) to be brought into sliding contact only with the lower of a pair of side edges of the tape (10), with the lower side edge positioned closer to the chassis (1), and the fixed guide member (5) is operable to regulate the level of the tape (10) widthwise thereof by receiving the lower side edge of the tape by the tape guide face (54) while being held out of contact with the main surface of the tape (10), and the fixed guide member (5) comprises a resin boss (52) provided upright on the chassis (1), and a metal flange plate (51) attached to an upper end of the boss (52), and the boss (52) has a flange receiving face (56) receiving a rear side of the flange plate (51), and a plurality of elastic hooks (53, 53) engaging a front side of the flange plate (51) on the flange receiving face (56), the front side of the flange plate (51) providing the tape guide face (54).

* * * * *